United States Patent
Goto et al.

(10) Patent No.: US 7,883,118 B2
(45) Date of Patent: Feb. 8, 2011

(54) THREADED JOINT FOR STEEL PIPES

(75) Inventors: Kunio Goto, Kobe (JP); Ryuichi Imai, Wakayama (JP)

(73) Assignees: Sumitomo Metal Industries, Ltd., Osaka (JP); Vallourec Mannesmann Oil & Gas France, Aulnoye-Aymeries (FR)

( * ) Notice: Subject to any disclaimer, the term of this patent is extended or adjusted under 35 U.S.C. 154(b) by 1112 days.

(21) Appl. No.: 11/390,336

(22) Filed: Mar. 28, 2006

(65) Prior Publication Data

US 2006/0228505 A1 Oct. 12, 2006

Related U.S. Application Data

(60) Provisional application No. 60/665,865, filed on Mar. 29, 2005.

(51) Int. Cl.
*F16L 7/00* (2006.01)

(52) U.S. Cl. .......................... 285/94; 285/45; 285/333; 285/390

(58) Field of Classification Search .............. 285/45, 285/94, 55, 333, 334, 390; 418/36.9
See application file for complete search history.

(56) References Cited

U.S. PATENT DOCUMENTS

| | | | | |
|---|---|---|---|---|
| 3,819,385 A * | 6/1974 | Schumichen et al. | ...... | 106/14.12 |
| 4,325,985 A * | 4/1982 | Wallace | ...... | 427/520 |
| 4,357,438 A * | 11/1982 | Sattlegger et al. | ...... | 524/490 |
| 4,468,309 A * | 8/1984 | White | ...... | 427/528 |
| 4,632,944 A * | 12/1986 | Thompson | ...... | 522/11 |
| 4,757,595 A * | 7/1988 | Fraering, Jr. | ...... | 29/447 |
| 4,874,638 A * | 10/1989 | Eck et al. | ...... | 427/222 |
| 4,880,476 A * | 11/1989 | Matsuda et al. | ...... | 148/253 |
| RE34,522 E * | 1/1994 | Wallace | ...... | 427/510 |
| 5,426,130 A * | 6/1995 | Thurber et al. | ...... | 522/14 |
| 5,759,647 A * | 6/1998 | Kuroda et al. | ...... | 428/34.5 |
| 6,011,100 A * | 1/2000 | Douais et al. | ...... | 524/425 |
| 6,251,515 B1 * | 6/2001 | Douais et al. | ...... | 428/330 |
| 6,921,110 B2 * | 7/2005 | Morotti et al. | ...... | 285/94 |
| 6,971,681 B2 * | 12/2005 | Dell'Erba et al. | ...... | 285/55 |
| 2003/0094810 A1 * | 5/2003 | Goto et al. | ...... | 285/94 |
| 2003/0159764 A1 * | 8/2003 | Goto | ...... | 148/519 |
| 2003/0160446 A1 * | 8/2003 | Goto et al. | ...... | 285/94 |
| 2004/0195825 A1 * | 10/2004 | Anraku et al. | ...... | 285/94 |
| 2004/0195826 A1 * | 10/2004 | Goto | ...... | 285/94 |
| 2004/0239105 A1 * | 12/2004 | Matsumoto et al. | ...... | 285/94 |
| 2006/0089276 A1 * | 4/2006 | Klotz | ...... | 508/464 |

FOREIGN PATENT DOCUMENTS

| | | |
|---|---|---|
| JP | 2002-173692 | 6/2002 |
| JP | 2004-053013 | 2/2004 |

* cited by examiner

*Primary Examiner*—James M Hewitt
*Assistant Examiner*—Jay R Ripley
(74) *Attorney, Agent, or Firm*—Clark & Brody

(57) ABSTRACT

A threaded joint for steel pipes for use in an oil well which has enhanced galling resistance and which is protected from rusting comprises a pin and a box each having a contact surface including a threaded portion and an unthreaded metal contact portion. The contact surface of at least one of the pin and the box has a lower layer of a viscous liquid or semisolid lubricating coating comprising at least wax and a fatty acid alkaline earth metal salt and not containing a harmful heavy metal such as lead and an upper layer of a dry solid coating formed from an aqueous resin coating composition, an organic solvent type coating composition, or an ultraviolet curing coating composition.

11 Claims, 4 Drawing Sheets

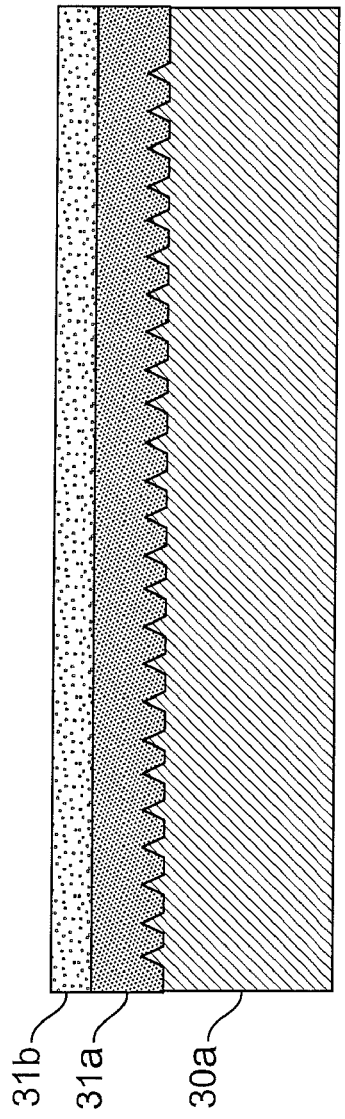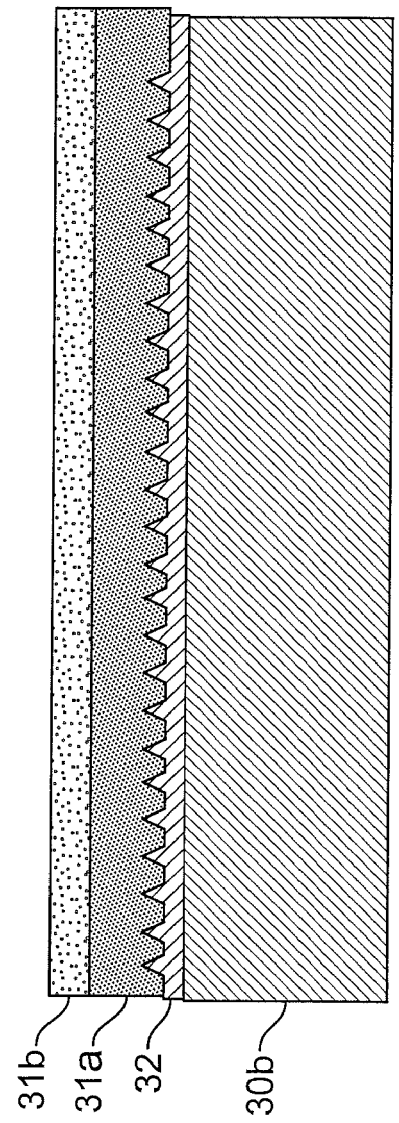
FIG. 3A
FIG. 3B

THREADED JOINT FOR STEEL PIPES

CROSS REFERENCE TO RELATED APPLICATIONS

This application claims the benefit under 35 U.S.C. §119(e) of U.S. Provisional Application No. 60/665,865 filed Mar. 29, 2005.

TECHNICAL FIELD

This invention relates to a threaded joint for steel pipes, particularly to a threaded joint for OCTG (oil country tubular goods), and to a surface treatment method therefor. A threaded joint for steel pipes according to the present invention can reliably exhibit excellent galling resistance without being coated with compound grease which in the past has been applied to threaded joints when connecting OCTG. Accordingly, a threaded joint for steel pipes according to the present invention can avoid the harmful effects on the global environment and humans caused by compound grease.

BACKGROUND ART

OCTG such as tubing and casing used in the excavation of oil wells for exploration of crude oil and gas oil are usually connected to each other by threaded joints. In the past, the depth of oil wells was 2,000-3,000 meters, but in deep oil wells such as recent offshore oil fields, it may reach 8,000-10,000 meters.

In their environment of use, threaded joints for connecting OCTG are subjected to axial tensile forces caused by the weight of the OCTG and the threaded joints themselves, the combination of internal and external pressures, and geothermal heat. Accordingly, they need to be able to maintain airtightness without undergoing damage even in such a severe environment.

A typical threaded joint used for connecting OCTG has a pin-box structure in which a pin has a male thread formed on the end portion of an oil well pipe and a box has a female thread formed on the inner surface of a threaded connecting member (a coupling). An unthreaded metal contact portion is formed at the end of the male thread of the pin and at the base of the female thread of the box. By inserting one end of an oil well pipe into a threaded connecting member and fastening the male thread and the female thread to each other, the unthreaded metal contact portions of the pin and the box are made to contact each other to form a metal-to-metal seal portion which ensures airtightness.

During the process of lowering tubing or casing into an oil well, due to various problems, it is sometimes necessary to loosen a joint which has been once fastened, to lift the pipes out of the oil well, to refasten them, and then relower them. API (American Petroleum Institute) requires galling resistance such that unrecoverable severe seizing referred to as galling does not occur and airtightness is maintained even if fastening (makeup) and loosening (breakout) are repeated ten times for a joint for tubing or three times for a joint for casing.

At the time of fastening, in order to increase galling resistance and airtightness, a viscous liquid lubricant which contains heavy metal powders and which is referred to as "compound grease" is applied to the contact surfaces (namely, the threaded portions and the unthreaded metal contact portions) of a threaded joint. Such a compound grease is specified by API Bulletin 5A2.

In the past, it has been proposed to carry out various types of surface treatment such as nitriding, various types of plating including zinc plating and composite plating, and phosphate chemical conversion treatment on the contact surfaces of a threaded joint to form one or more layers in order to increase the retention of compound grease and improve sliding properties. However, as described below, the use of compound grease poses the threat of harmful effects on the environment and humans.

Compound grease contains large amounts of powders of heavy metals such as zinc, lead, and copper. When fastening a threaded joint, grease which has been applied is washed off or overflows to the exterior surface, and there is the possibility of its producing harmful effects on the environment and especially on sea life, particularly due to harmful heavy metals such as lead. In addition, the process of applying compound grease worsens the working environment, and there is also a concern of its having harmful effects on humans.

In recent years, as a result of the enactment in 1998 of the OSPAR Convention (Oslo-Paris Convention) for preventing ocean pollution in the Northeast Atlantic, strict restrictions concerning the global environment are becoming more numerous, and in some regions, the use of compound grease is already in the process of restriction. Accordingly, in order to avoid harmful effects on the environment and humans in the excavation of gas wells and oil wells, a demand has developed for threaded joints which can exhibit excellent galling resistance without using compound grease.

As a threaded joint which can be used for connecting OCTG without application of compound grease, the present inventors proposed in JP 2002-173692A a threaded joint for steel pipes having a viscous liquid or semisolid lubricating coating formed thereon, and in JP 2004-53013 a threaded joint for steel pipes in which tackiness of the threaded joint surface, which is a drawback of a viscous liquid or semisolid lubricating coating, is suppressed by covering the lubricating coating with an upper lubricating layer which may be based on a certain powder or oxide wax so as to minimize the adhesion of foreign matter such as dust, sand, and debris.

DISCLOSURE OF THE INVENTION

A viscous liquid or semisolid lubricating coating as described in JP 2002-173692A has excellent lubricating properties without application of compound grease due to its self-lubricating function in that it exhibits ductility or fluidity in the form of a coating. However, the sticky surface of such a coating is problematic since foreign matter such as dirt and oxide scale, and particularly rust remaining on the inner surface of OCTG and abrasive particles for blasting which are introduced in the OCTG for rust removal fall off when the OCTG are stood vertically, and they adhere to the lubricating coating and end up being embedded therein. This causes a significant problem since the embedded foreign matter can not be completely removed by air blowing or similar means. As a result, lubricating properties worsen, and galling can not be completely prevented when OCTG are repeatedly tightened and loosened.

Even if an upper lubricating layer which is in solid at 40° C. is formed in accordance with JP 2004-53013A, the surface of the lubricating coating is still soft and remains tacky to some extent. In addition, OCTG are frequently exposed to a high temperature exceeding 40° C. particularly when used in oil fields in desert regions or during storage in some conditions. In this situation, the upper layer is not effective since it softens and ends up flowing.

An object of the present invention is to solve the above-described problems of the prior art.

Another object of the invention is to provide a threaded joint for steel pipes which suppresses the formation of rust and which has excellent galling resistance and air tightness without using compound grease.

A further object of the invention is to provide a threaded joint for steel pipes which has a viscous liquid or semisolid lubricating coating with its surface being hard, dry, and non-tacky such that it is difficult for foreign matter such as rust or blasting abrasive particles to adhere to the surface even in an environment exceeding 40° C. or to become embedded in the lubricating coating so as to be removed by blowing air if they do adhere.

It has been found that these objects can be achieved by forming a lower viscous liquid or semisolid lubricating coating and an upper dry solid coating on a threaded joint. The role of the dry solid coating to eliminate the tackiness of the lubricating coating ends upon contact at the time of initial tightening of a threaded joint, and it should not subsequently impede the lubricating effect of the underlying viscous liquid or semisolid lubricating coating. In other words, it is not necessary for the upper layer to have lubricating properties, in contrast to the teaching in JP 2004-53013A. However, there are preferred combinations between the viscous liquid or semisolid lubricating coating and the dry solid coating and the thicknesses of these coatings from the standpoint of adhesion at the time of coating formation.

In a broad aspect, the present invention is a threaded joint for steel pipes comprising a pin and a box each having a contact surface including a threaded portion and an unthreaded metal contact portion, characterized in that the contact surface of at least one of the pin and the box has a viscous liquid or semisolid lubricating coating and a dry solid coating formed atop the lubricating coating.

In one embodiment, the present invention is a threaded joint for steel pipes comprising a pin and a box each having a contact surface including a threaded portion and an unthreaded metal contact portion, characterized in that the contact surface of one of the pin and the box has a viscous liquid or semisolid lubricating coating and a dry solid coating formed atop the lubricating coating, and the contact surface of the other of the pin and the box has been subjected to preparatory surface treatment by a method selected from blasting, pickling, phosphate chemical conversion treatment, oxalate chemical conversion treatment, borate chemical conversion treatment, metal plating, and a combination of two or more of these treatments, and optionally a dry solid coating is formed atop the surface which has been subjected to the preparatory surface treatment.

A threaded joint for steel pipes according to the present invention preferably satisfies at least one of the following:

- the viscous liquid or semisolid lubricating coating comprises wax, a fatty acid alkaline earth metal salt, and optionally a solid lubricating powder, and it is substantially free from harmful heavy metals;
- the dry solid coating is either a coating formed from an aqueous composition comprising a water soluble or water dispersible polymeric compound as a film-forming component, or a coating formed from a composition in organic solvent solution comprising a polymeric compound as a film-forming component;
- the polymeric compound is an acrylic resin;
- the dry solid coating is formed from a coating composition based on an ultraviolet curing resin in which the composition preferably further contains a lubricant such as a metal soap and a fibrous filler such as an acicular carbonate;
- the thickness of the viscous liquid or semisolid lubricating coating is 10-200 µm, the thickness of the dry solid coating formed atop the lubricating coating is 5-50 µm, and (thickness of the lubricating coating)>(thickness of the dry solid coating);
- the contact surface having a viscous liquid or semisolid lubricating coating is subjected to preparatory surface treatment by a method selected from blasting, pickling, phosphate chemical conversion treatment, oxalate chemical conversion treatment, borate chemical conversion treatment, metal plating, and a combination of two or more of these prior to forming the lubricating coating;
- the contact surface having a viscous liquid or semisolid lubricating coating is subjected to preparatory surface treatment by metal plating, metal alloy plating, or multiple-layer plating with a metal and/or metal alloy prior to forming the lubricating coating;
- the steel pipes are for use in an oil well, namely, OCTG.

The present invention also provides a method for surface treatment of a threaded joint for steel pipes comprising a pin and a box each having a contact surface including a threaded portion and an unthreaded metal contact portion, the method comprising applying a coating composition comprising at least wax and a fatty acid alkaline earth metal salt and substantially not containing a harmful heavy metal to the contact surface of at least one of the pin and the box to form a viscous liquid or semisolid lubricating coating, and then applying an aqueous coating composition based on a water soluble or water dispersible polymeric compound or a coating composition based on a polymeric compound dissolved in an organic solvent to form a dry solid coating atop the lubricating coating.

The present invention also provides a method for surface treatment of a threaded joint for steel pipes comprising a pin and a box each having a contact surface including a threaded portion and an unthreaded metal contact portion, the method comprising applying a coating composition comprising at least wax and a fatty acid alkaline earth metal salt and substantially not containing a harmful heavy metal to the contact surface of at least one of the pin and the box to form a viscous liquid or semisolid lubricating coating, and then applying a coating composition based on an ultraviolet curing resin followed by irradiation with ultraviolet radiation to form a dry solid coating atop the lubricating coating.

Furthermore, the present invention provides a method of connecting a plurality of OCTG using either one of the above-described threaded joint for steel pipes or a threaded joint for steel pipes which has undergone surface treatment by one of the above-described methods without application of a lubricating grease such as compound grease.

According to the present invention, two layers of coating consisting of a lower viscous liquid or semisolid lubricating coating and an upper dry solid coating are formed on the contact surfaces of a threaded joint for steel pipes having an unthreaded metal contact portion. Due to the upper dry solid coating, the contact surfaces of the threaded joint are maintained in a dry state without tackiness. Due to the contact pressure and heat of friction at the time of tightening with thread engaging, the upper dry solid coating is torn out and it is incorporated into the lower lubricating coating. As a result, the lower lubricating coating exhibits its inherent lubricating effect without obstruction by the upper dry solid coating and it contributes to preventing galling of the threaded joint. In addition, the two coating layers exhibit a rust preventing effect on the contact surfaces of the threaded joint before tightening.

Accordingly, in the period until the threaded joint is tightened, even if foreign matter such as rust, oxidized scale, and blasting abrasive particles adhere to the contact surfaces of the threaded joint, the surface is dry and not tacky, so just the foreign matter can be easily removed by a method such as blowing air. As a result, even under severe lubricating conditions in which the pressure locally becomes excessive and plastic deformation results due to eccentricity or leaning of the joint due to problems in assembly at the time of tightening of a joint or introduction of foreign matter, galling can be prevented by the lower lubricating coating.

Thus, a threaded joint for steel pipes according to the present invention suppresses the occurrence of rust, it makes it difficult for foreign matter to adhere, and even if it adheres, the foreign matter can be easily removed. Therefore, even if tightening and loosening are repeated, a lubricating function is continuously exhibited, and air tightness after tightening can be maintained.

BRIEF DESCRIPTION OF THE DRAWINGS

FIG. 3 is an explanatory view showing coatings formed on the contact surfaces of a threaded joint for steel pipes according to the present invention, in which FIG. 3(a) shows an example of roughening of a contact surface itself, and FIG. 3(b) shows an example of forming a surface treatment coating for surface roughening on a contact surface.

BEST MODE FOR CARRYING OUT THE INVENTION

Below, embodiments of a threaded joint for steel pipes according to the present invention will be described in detail.

Figure 1:
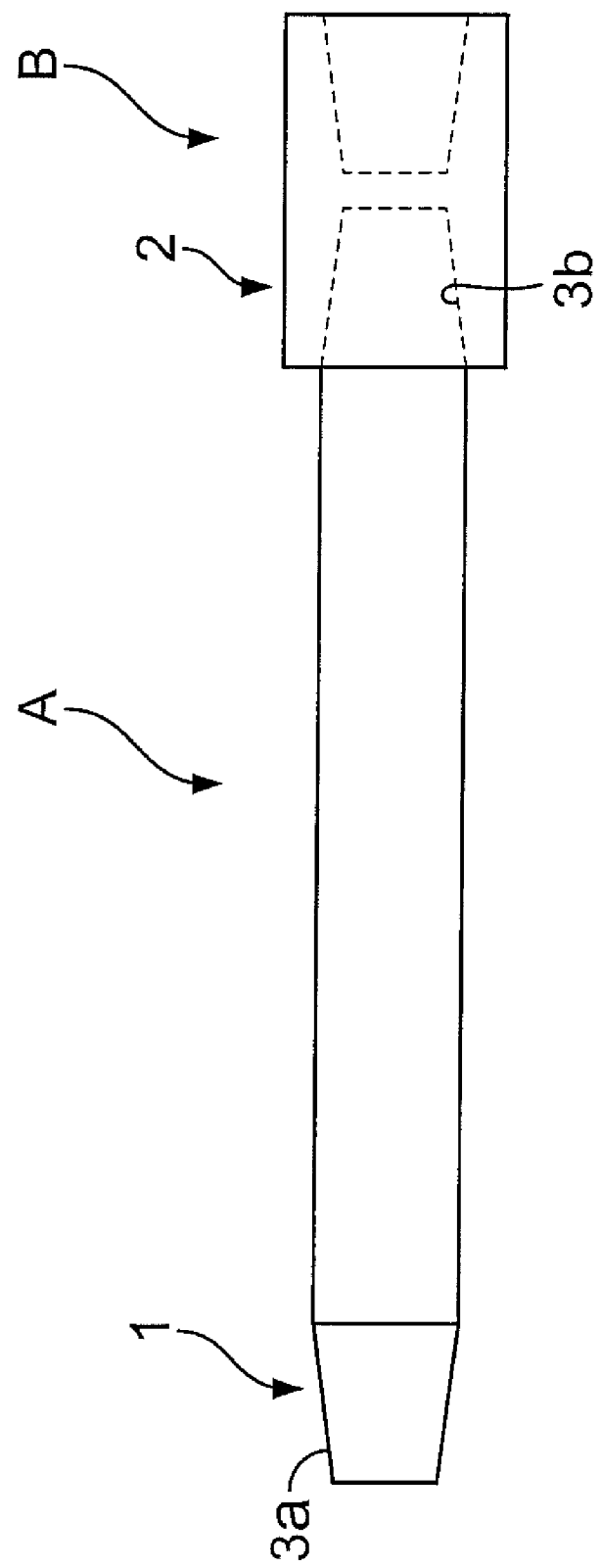
FIG. 1 schematically shows the assembled structure of a steel pipe and a threaded joint member at the time of shipment of a steel pipe.

FIG. 1 schematically illustrates the assembled structure of a typical threaded joint, showing the state of a steel pipe for OCTG and a threaded connecting member at the time of shipment. A steel pipe A has at both of its ends a pin 1 having a male thread portion 3a formed on its outer surface, and a threaded connecting member (a coupling) B has at both of its ends a box 2 having a female thread portion 3b formed on its inner surface. A pin refers to a member of a threaded joint having a male thread, and a box refers to a member of a threaded joint having a female thread. One end of the steel pipe A has the threaded connecting member B which has previously been connected to the pipe. Although not shown in the drawing, a protector for protecting the threaded portions is mounted on the unconnected pin of the steel pipe A and on the unconnected box of the threaded connecting member B prior to shipment. The protectors are removed prior to using the threaded joint.

Typically, as shown in the drawing, a pin is formed on the outer surface of both ends of a steel pipe, and a box is formed on the inner surface of a threaded connecting member, which is a separate member. Conversely, it is possible in principle to make the inner surface of both ends of a steel pipe a box and to make the outer surface of a threaded connecting member a pin. There are also integral threaded joints which do not employ a threaded connecting member and in which one end of a steel pipe is made a pin and the other end is made a box.

Figure 2:
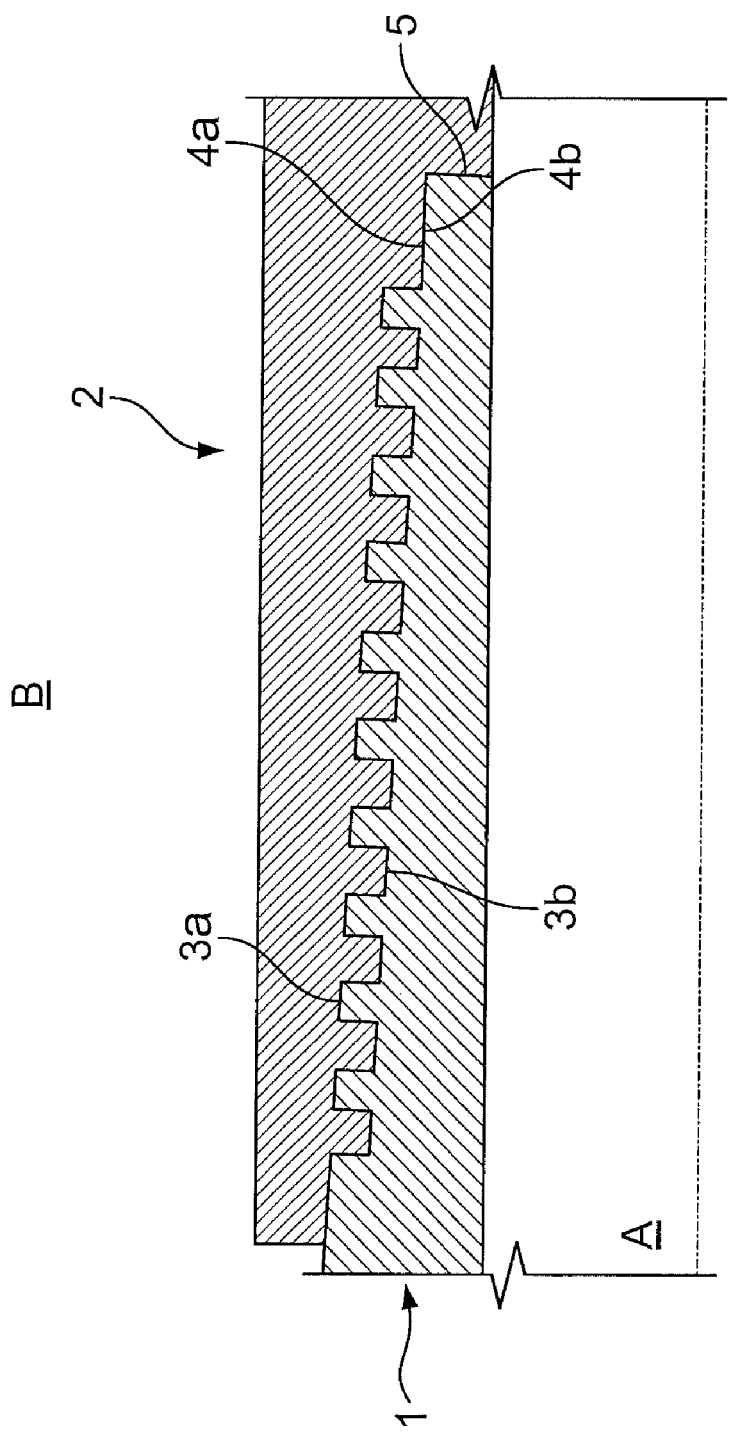
FIG. 2 schematically shows a connecting portion of a threaded joint.

FIG. 2 schematically shows the structure of a typical threaded joint for steel pipes (referred to below simply as a "threaded joint"). The threaded joint is constituted by a pin 1 formed on the outer surface of the end of a steel pipe A and a box 2 formed on the inner surface of a threaded connecting member B. The pin 1 has a male thread portion 3a, as well as an unthreaded metal contact portion 4a and a shoulder portion 5 positioned at the end of the steel pipe. Corresponding thereto, the box 2 has a female thread portion 3b and an unthreaded metal contact portion 4b on the inner side thereof.

The threaded portions 3a and 3b and the unthreaded metal contact portions 4a and 4b of the pin 1 and the box 2, respectively, are the contact surfaces of the threaded joint. These contact surfaces need to have galling resistance, airtightness, and corrosion resistance. In the past, to meet these requirements, compound grease containing heavy metal powder was applied to or a viscous liquid or semisolid lubricating coating was formed on the contact surfaces. However, as stated earlier, these lubricating methods had problems with respect to humans and the environment or problems with respect to galling resistance in actual use due to a decrease in performance during storage or due to adhesion of foreign matter.

According to the present invention, as shown with respect to the unthreaded metal contact portions in FIGS. 3(a) and 3(b), the contact surface of at least one of the pin and the box have a lower viscous liquid or semisolid lubricating coating 31a and an upper dry solid coating 31b on the surface of steels 30a or 30b. A threaded joint according to the present invention has a surface which is not tacky and to which it is difficult for foreign matter to adhere in the period up to the tightening of the threaded joint, and at the time of tightening of the threaded joint, the lubricating coating exhibits its inherent effects of providing lubrication and maintaining gas tightness, so galling of the threaded joint can be prevented and air tightness can be maintained after tightening even if tightening and loosening are repeated without using compound grease.

The surface on which the lubricating coating 31a is formed is preferably a rough surface. As shown in FIG. 3(a), surface roughening can be direct surface roughening by blasting or pickling of the surface of the steel 30a, or as shown in FIG. 3(b), it can be carried out by forming a surface treatment coating 32 having a rough surface on the surface of the steel 30b prior to forming the lubricating coating 31a.

The viscous or semisolid lubricating coating 31a and the dry solid coating 31b can be formed by preparing a coating composition using a suitable solvent, if necessary, to dilute it, applying it by a suitable method such as brush coating, spraying, or immersion, followed by, if necessary, drying by evaporating the solvent.

Figure 4:
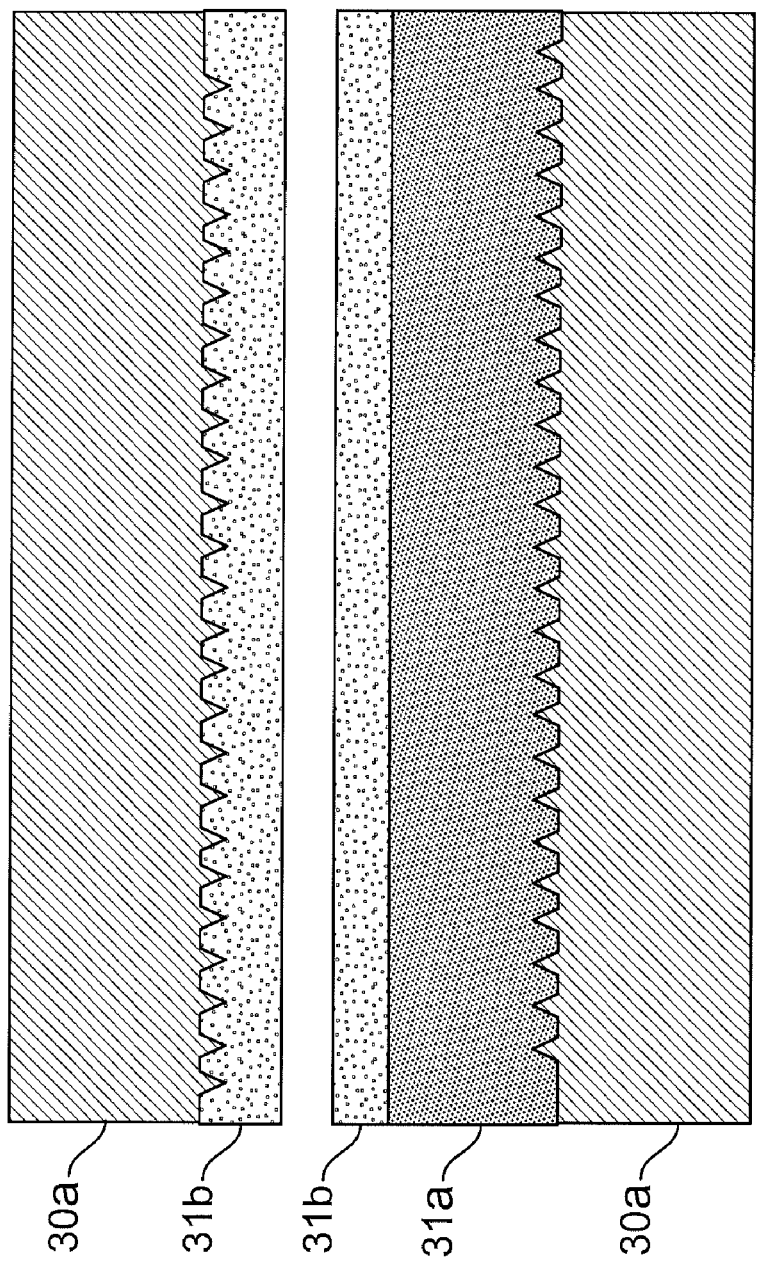
FIG. 4 is an explanatory view showing two contact surfaces, with one having a dry solid coating only.

These coatings may be formed on the contact surfaces of both the pin and the box, but in cases like that shown in FIG. 1 in which a pin and a box are connected to each other at the time of shipment, the lubricating coating and the dry solid coating may be formed on just one of the pin and the box. FIG. 4 is an example, wherein one of the contact surfaces has just the dry solid coating 31b on the steel 30a with the other one having the lubricating coating 31a and dry solid coating 31b on the steel 30b. When carrying out treatment on just one member, surface treatment and the process of application for forming the coatings are easier to perform on the connecting member which is shorter, so it is convenient to form the lubricating coating and the dry solid coating on the contact surface of the connecting member (normally the contact surfaces of the box). In cases in which the pin and the box are not connected, it is preferable to form these coatings on both the pin and the box so as to impart rust preventing properties to all the contact surfaces, whereby a decrease in lubricating properties and air tightness due to the occurrence of rust can be prevented.

The lubricating coating and the dry solid coating preferably cover the entirety of the contact surfaces of the pin and/or the box, but the case in which only a portion of the contact surface (for example, only the unthreaded metal contact portion) is covered is encompassed by the present invention.

[Viscous Liquid or Semisolid Lubricating Coating]

In order to prevent galling when steel pipes are connected to each other by a threaded joint, a viscous liquid or semisolid lubricating coating is formed on a contact surface of at least one of the pin and box of the threaded joint as a first layer (lower layer). This lubricating coating preferably is a coating containing at least wax and a fatty acid alkaline earth metal salt.

A viscous liquid indicates a high viscosity liquid having an extremely low fluidity and remaining on the surface without flowing off in conditions of ambient temperature and atmospheric pressure on which external factors (pressure and high temperature) are not acting, and a semisolid indicates a material such as wax which can maintain a fixed shape in such conditions.

The lubricating coating preferably does not contain a substantial amount (specifically, an amount exceeding 5 mass % of the lubricating coating) of harmful heavy metals, and more preferably it does not contain any harmful heavy metals at all. Examples of harmful heavy metal include lead, chromium, cadmium, mercury, and the like.

Compound grease which has conventionally been used contains a large amount of powder of soft heavy metals such as lead and zinc in order to prevent galling by suppressing direct contact between metal surfaces. In the present invention, the fatty acid alkaline earth metal salt which is contained in the lubricating coating performs the same function, so adequate lubricating properties can be exhibited without the use of heavy metals.

The mass ratio between the alkaline earth metal salt and the wax is preferably in the range of 0.8-5 parts of the fatty acid alkaline earth metal salt to one part of the wax. From the standpoint of galling resistance, it is more preferably in the range of 1-3 parts of the fatty acid alkaline earth metal salt to one part of the wax.

A fatty acid alkaline earth metal salt exhibits the effect of preventing galling. From the standpoint of lubricating properties and rust prevention, a fatty acid having 12-30 carbon atoms is preferred. The fatty acid can be either saturated or unsaturated. Mixed fatty acids derived from natural oils and fats such as beef tallow, lard, wool fat, palm oil, rapeseed oil, and coconut oil, and single compounds such as lauric acid, tridecylic acid, myristic acid, palmitic acid, lanopalmitic acid, stearic acid, isostearic acid, oleic acid, elaidic acid, arachic acid, behenic acid, erucic acid, lignoceric acid, and lanoceric acid can be used. The salt is preferably in the form of a calcium salt, and it may be either a neutral salt or a basic salt. It is preferably in the form of calcium stearate.

Wax not only has the effect of preventing galling but it also reduces fluidity and helps film formation. Any of animal, vegetable, mineral, and synthetic waxes may be used. Examples of waxes which can be used are beeswax and whale tallow (animal waxes); Japan wax, carnauba wax, candelilla wax, and rice wax (vegetable waxes); paraffin wax, microcrystalline wax, petrolatum, montan wax, ozokerite, and ceresine (mineral waxes); and oxide wax, polyethylene wax, Fischer-Tropsch wax, amide wax, hardened castor oil (castor wax) (synthetic waxes). Of these, paraffin wax with a molecular weight of 150-500 is particularly preferred.

In the present invention, it is preferable to include a solid lubricant powder in the lubricating coating in order to increase the strength of the lubricating coating and suppress fluidity at high temperatures and to further increase galling resistance. Any harmless solid lubricant powder which is not toxic may be used. Preferably, the solid lubricant is selected from gilsonite, graphite, talc, mica, calcium carbonate, bentonite, tungsten disulfide, tin disulfide, molybdenum disulfide, and melamine cyanurate (MCA). Gilsonite is a natural asphalt, and the same effect is obtained whether it is added as a powder or it is melted at a temperature above its melting point. The solid lubricant powder, when added, is present in an amount of at most 0.2 parts and preferably at least 0.005 and at most 0.1 parts with respect to one part of wax.

In order to increase dispersibility of the fatty acid alkaline earth metal salt in the composition used to form the lubricating coating or in order to improve the properties of the lubricating coating, additional components such as one or more selected from organic resins and various oils and additives (such as extreme pressure agents) normally used in lubricating oil can be included in the lubricating coating. Examples of oils which can be used include basic oils, resins, synthetic esters, natural oils, and mineral oils.

An organic resin and particularly a thermoplastic resin acts to suppress tackiness of the lubricating coating and increases the thickness of the coating. Moreover, when it is introduced into a frictional interface, it functions to increase galling resistance and decrease friction between the contact surfaces of a threaded joint even when a high tightening torque (a high pressure) is applied. In view of these effects, an organic resin is preferably included in the lubricating coating.

Examples of thermoplastic resins which can be used herein are polyethylene resins, polypropylene resins, polystyrene resins, poly(methyl acrylate) resins, styrene/acrylic acid ester copolymer resins, and polyamide resins. Copolymers or blends of these or of these with other thermoplastic resins can also be used. The thermoplastic resin preferably has a density (JIS K 7112) in the range of 0.9-1.2, and its thermal deformation temperature (JIS K 7206) is preferably in the range of 50-150° C. in view of the necessity for it to readily deform in order to exhibit lubricating properties between the frictional surfaces of a threaded joint.

If the thermoplastic resin is present in a coating in the form of particles, it exhibits a lubricating action similar to a solid lubricant when it is introduced into a frictional interface, and it is particularly effective at increasing galling resistance. Therefore, a thermoplastic resin is preferably present in the lubricating coating in the form of a powder and particularly a spherical powder. In this case, if the composition used for forming the lubricating coating (referred to below as the "lubricating coating composition") contains a solvent, a thermoplastic resin which does not dissolve in the solvent is selected. The powder of the thermoplastic resin can be dispersed or suspended in the solvent, and it does not matter if it swells in the solvent.

The powder of the thermoplastic resin preferably has a fine particle diameter from the standpoints of increasing the coating thickness and increasing galling resistance. However, if the particle diameter is smaller than 0.05 μm, gelling of the lubricating coating composition becomes marked, and it becomes difficult to form a coating having a uniform thickness. On the other hand, if the particle diameter exceeds 30 μm, it becomes difficult to introduce the powder into the frictional interface, and it tends to sediment or float in the lubricating coating composition thereby making it difficult to form a uniform coating. Accordingly, the particle diameter of the thermoplastic resin powder is preferably in the range of 0.05-30 μm, and more preferably in the range of 0.07-20 μm.

An natural oil and fat which can be used as an oil component includes beef tallow, lard, wool fat, palm oil, rapeseed oil, and coconut oil. A mineral oil and a synthetic mineral oil which have a viscosity of 10-300 cSt at 40° C. can also be used.

A synthetic ester which can be used as an oil component can increase the plasticity of the thermoplastic resin and at the same time can increase fluidity of the lubricating coating when the coating is subjected to hydrostatic pressure, so it is a preferred oil component for using in a lubricating coating composition according to the present invention. A synthetic ester with a high melting point can also serve to adjust the melting point and the softness of a lubricating coating according to the present invention. Examples of synthetic esters are fatty acid monoesters, dibasic acid diesters, and fatty acid esters of trimethylolpropane and pentaerythritol.

Examples of fatty acid monoesters are monoesters of carboxylic acids having 12-24 carbon atoms such as myristic acid, palmitic acid, stearic acid, oleic acid, isostearic acid, linolic acid, linolenic acid, elaidic acid, arachic acid, behenic acid, erucic acid, and lignoceric acid with higher alcohols having 8-20 carbon atoms such as octyl alcohol, capryl alcohol, nonyl alcohol, decyl alcohol, lauryl alcohol, tridecyl alcohol, myristyl alcohol, cetyl alcohol, stearyl alcohol, isostearyl alcohol, oleyl alcohol, and decyl alcohol.

Examples of dibasic acid diesters are diesters of dibasic acids having 6-10 carbon atoms such as adipic acid, pimelic acid, suberic acid, azelaic acid, and sebacic acid with higher alcohols having 8-20 carbon atoms such as those listed with respect to monoesters.

Examples of fatty acids which form a fatty acid ester of trimethylolpropane or pentaerythritol are those having 8-18 carbon atoms such as caprylic acid, decylic acid, lauric acid, myristic acid, palmitic acid, stearic acid, oleic acid, and isostearic acid. Alcohols may be the same higher alcohols listed above.

Examples of basic oils are basic sulfonates, basic salicylates, basic phenates, basic carboxylates, and the like. These basic oils are in the form of a salt of an aromatic acid with excess alkali, and as described below, they are grease-like semisolid substances in which excess alkali is dispersed as colloidal particles in the oily aromatic acid.

The alkali which constitutes the cation portion of this salt (basic oil) may be an alkali metal or an alkaline earth metal, but preferably it is an alkaline earth metal and particularly calcium, barium, or magnesium. The same effect can be obtained whichever of these is employed.

The higher the basicity of the basic oil, the greater the amount of the metal salt which functions as a solid lubricant, and the better are the lubricating properties (galling resistance). In addition, when the basicity exceeds a certain level, it has the effect of neutralizing acid components, so the rust preventing ability of the lubricating coating increases. For these reasons, the basic oil used in the present invention is preferably one having a basicity (JIS K 2501) (when using two or more, the weighted average of the basicity taking the weight into consideration) is preferably at least 50 mg KOH/g. However, if the basicity exceeds 500 mg KOH/g, hydrophilicity increases, rust resistance begins to decrease, and it becomes easy for rust to occur. A preferred basicity is 100-500 mg KOH/g, and more preferably it is in the range of 250-450 mg KOH/g.

An extreme pressure agent has the effect of increasing galling resistance of a lubricating coating if present therein. Nonlimiting examples of an extreme pressure agent are vulcanized oils, polysulfides, phosphates, phosphites, thiophosphates, and dithiophosphoric acid metal salts.

Examples of preferred vulcanized oils are compounds which are obtained by adding sulfur to unsaturated animal or vegetable oils such as olive oil, castor oil, rice bran oil, cottonseed oil, rapeseed oil, soy bean oil, corn oil, beef tallow, and lard and heating the mixture and which contain 5-30 mass % of sulfur.

Examples of preferred polysulfides are polysulfide compounds of the formula: $R_1—(S)_c—R_2$ (wherein $R_1$ and $R_2$ may be the same or different and indicate an alkyl group having 4-22 carbon atoms, an aryl group, an alkylaryl group, or an arylalkyl group each with up to 22 carbon atoms, and c is an integer from 2 to 5) and olefin sulfides containing 2-5 sulfur bonds in one molecule. Dibenzyl disulfide, di-tert-dodecyl polysulfide, and di-tert-nonyl polysulfide are particularly preferred.

Phosphates, phosphites, thiophosphates, and dithiophosphoric acid metal salts may be of the following general formulas:

phosphates: $(R_3O)(R_4O)P(=O)(OR_5)$
phosphites: $(R_3O)(R_4O)P(OR_5)$
thiophosphates: $(R_3O)(R_4O)P(=S)(OR_5)$
dithiophosphoric acid metal salts: $[(R_3O)(R_6O)P(=S)—S]_2-M$ In the above formulas, $R_3$ and $R_6$ indicate an alkyl group, a cycloalkyl group, an alkylcycloalkyl group, an aryl group, an alkylaryl group, or an arylalkyl group each having up to 24 carbon atoms, $R_4$ and $R_5$ indicate a hydrogen atom or an alkyl group, a cycloalkyl group, an alkylcycloalkyl group, an aryl group, an alkylaryl group, or an arylalkyl group each having up to 24 carbon atoms, and M indicates molybdenum (Mo), zinc (Zn), or barium (Ba).

Particularly preferred examples of these compounds include tricresyl phosphate and dioctyl phosphate for phosphates; tristearyl phosphite, tridecyl phosphite, and dilaurlyl hydrogen phosphite for phosphites; trialkyl thiophosphate in which each of $R_3$, $R_4$, and $R_5$ is an alkyl group having 12 or 13 carbon atoms and alkyltriphenyl thiophosphate for thiophosphates; and zinc dialkyl dithiophosphate in which each of $R_3$ and $R_6$ is a primary or secondary alkyl group having 3-20 carbon atoms for dithiophosphoric acid metal salts.

The lubricating coating composition may contain a solvent in order to decrease its viscosity, whereby the thickness and the structure of a coating formed from the composition can be made uniform and coating can be efficiently formed. The solvent is preferably volatile. Namely, in contrast to a base oil in a lubricating oil, the solvent preferably evaporates during the film-forming process, and preferably substantially none remains in the lubricating coating. "Volatile" means that it shows a tendency to vaporize when in the form of a coating at a temperature from room temperature to 150° C. However, since a lubricating coating according to the present invention is in the form of a viscous liquid or a semisolid, it is possible for a slight amount of solvent to remain in the coating.

There is no particular restriction on the type of solvent. Examples of volatile solvents which are suitable for use in the present invention are petroleum solvents such as cleaning solvent and mineral spirits, both specified as industrial gasoline by JIS K 2201, aromatic petroleum naphtha, xylene, and Cellosolves. A mixture of two or more of these may be used. A solvent having a flash point of at least 30° C., an initial boiling point of at least 150° C., and a final boiling point of at most 210° C. is preferred from the standpoints that it is relatively easy to handle and evaporates rapidly so that the drying time can be short.

The lubricating coating composition may further contain one or more additional components such as an antioxidant, a preservative, and a colorant, in addition to the above-described components.

The viscosity (kinematic viscosity in cSt, as measured by a Brookfield viscometer) of the lubricating coating composition may be appropriately selected depending on the coating method and can be adjusted by addition of a solvent. A preferable viscosity is at most 4000 cSt at 40° C. in the case of spray coating or immersion and at most 1000 cSt at 60° C. in the case of brush coating.

The lubricating coating composition can be prepared by initially heating the wax component to a temperature above its melting point to form a melt, to which the other components are added and mixed. Alternatively, the composition can be prepared by dispersing or dissolving all the components in a solvent without melting a wax component.

The thickness of the viscous liquid or semisolid lubricating coating as a first (lower) layer is preferably in the range of 10-200 μm for the following reasons.

The upper layer (second layer) in the form of a dry solid coating formed on the lower lubricating coating tears out at the time of initial tightening and is absorbed by the lower lubricating coating. The lower lubricating coating is then capable of exhibiting its lubricating action in the friction interface.

Accordingly, the lower lubricating coating preferably has a sufficient thickness to fill minute gaps in the contact surface area, such as between thread crests. If the coating thickness is too small, the characteristic effects of a viscous liquid or semisolid lubricating coating that oil seeps from the frictional surface due to hydrostatic pressure generated at the time of tightening and that lubricant flows into a gap from other gaps can no longer be obtained. For this reason, the thickness of the lower lubricating coating is preferably at least 10 μm.

At the time of carrying out tightening requiring lubrication, the contact surfaces of the box and the pin contact each other, so from the standpoint of lubrication, it is sufficient to treat just one of either the pin and the box according to the present invention. However, from the standpoint of preventing rusting of a pin and a box which are exposed to air during storage, it is preferable to form a lubricating coating on both the pin and the box. The minimum coating thickness necessary for rust prevention is also 10 μm. Accordingly, when a separate protecting means for preventing rust (such as previous connection of a pin and a box or installation of a protector) is not employed, a coating of at least 10 μm is preferably formed on both the pin and the box.

On the other hand, if the lubricating coating is too thick, not only is lubricant wasted, but the prevention of environmental pollution, which is one of the objects of the present invention, is impeded. From this standpoint, the upper limit on the thickness of the lubricating coating is preferably around 200 μm.

A more preferred thickness for the lubricating coating is 30-150 μm. However, as explained below, when the contact surface on which the lubricating coating is formed is roughened, the thickness of the lubricating coating is preferably made larger than the value of Rmax of the roughened contact surface. When the contact surface is roughened, the thickness of the lubricating coating is the mean value of the coating thickness throughout the coating, which can be calculated by the area, weight, and density of the coating.

As a general tendency, when the lubricating coating contains an oil in a considerably large amount, it becomes a viscous liquid coating, and when the amount of the oil is small or when the coating contains no oil, it becomes a semisolid coating.

[Dry Solid Coating]

A second (upper) layer of a dry solid coating is formed atop the first layer of a viscous liquid or semisolid lubricating coating. The dry solid coating may be a resinous coating based on an organic polymeric compound (organic resin). Preferably, it does not contain a wax.

In a first embodiment, a composition for forming the dry solid coating (referred to below as a "solid coating composition") is an aqueous composition containing a water soluble or water dispersible polymeric compound as a film-forming component. The solvent in this aqueous composition preferably consists solely of water, but one or more water-miscible organic solvents may be used with water.

The amount on a mass basis of the water soluble or dispersible polymeric compound in the aqueous solid coating composition is preferably, on a mass basis, at most 9 parts and more preferably in the range of 0.05-9 parts of the polymeric compound to one part of water from the standpoint of the uniformity and drying speed of the composition. It is also possible to add at most 0.1 parts of a film formation promoter. An example of a suitable film formation promoter is dipropylene glycol n-butyl ether.

As described above with respect to FIG. 1, in the period until a threaded joint for steel pipes is actually used, a protector is often mounted on a pin and a box which have not yet been connected to other member. The dry solid coating is required that it should not be torn when a protector is mounted thereon, that it should not dissolve when exposed to condensed water caused by the dew point during transport or storage, and that it should not readily soften when exposed to a high temperature exceeding 40° C.

Accordingly, the dry solid coating, once it is solidified by evaporation of water as a solvent, must have the properties that it not again dissolve in water (that it become water insoluble and water resistant), and that it not be easily destroyed or torn even if it is subjected to a certain amount of pressure. Examples of a water soluble or dispersible polymeric compound having such properties are water soluble polymers such as polyvinyl alcohol (PVA), polyethylene oxide (PEO), sodium polyacrylate, polyacrylamide, and polyamidine; and emulsion polymers such as vinyl acetate homopolymer emulsion, vinyl acetate copolymer emulsion, ethylene vinyl acetate (EVA) emulsion, acrylic polymer emulsion, acrylic styrene copolymer emulsion, polyvinylidine chloride emulsion, and other aqueous emulsion resins including aqueous polyurethane, dispersion-type fluororesins, acrylic resins, epoxy compounds, and silicones. From the standpoints of uniformly forming the coating thickness, affinity with the lower lubricating coating, and resistance to softening at high temperatures, a preferred polymeric compound is an acrylic resin.

As long as a dry solid coating which is not tacky can be formed after evaporation of water, the aqueous solid coating composition may further contain one or more additional components, in addition to the water soluble or dispersible polymeric compound, in order to increase resistance to softening at high temperatures and reduce friction and avoid peeling of the coating when installing a protector.

An example of such additional components is a solid lubricating powder such as silica, calcium stearate, calcium hydroxide, molybdenum disulfide, tungsten disulfide, graphite, polytetrafluoroethylene, boron nitride, and calcium carbonate, which can be present in the composition in an amount of at most 5 mass % based on the solids content of the composition. Preferably it is selected from silica, calcium stearate, calcium hydroxide, and calcium carbonate.

In a second embodiment, the solid coating composition for forming the upper layer of a dry solid coating is a solvent-type composition comprising a polymeric compound as a film-forming component dissolved in an organic solvent. From the standpoint of the uniformity, drying properties, and coatability of the composition, the amount of the polymeric component dissolved in the organic solvent is preferably at most 0.5 parts and preferably in the range of 0.1-0.4 parts relative to one part of the organic solvent on a mass basis.

As stated above, a dry solid coating formed from the solvent-type composition, once it is solidified by evaporation of the organic solvent, must have the properties that it not dissolve in water (that it become water insoluble and water resistant), and that it not be easily destroyed or torn even if it is subjected to a certain amount of pressure as applied when installing a protector.

Examples of polymeric compounds having such properties are epoxy resins, polyimide resins, polyamide-imide resins, polycarbodiimide resins, polyethersulfones, polyether-etherketones, phenolic resins, furan resins, fluororesins, acrylic resins, polyethylene resins, and silicone resins. From the standpoints of forming a uniform coating thickness, affinity for the lower lubricating coating, and strength and toughness of the coating, a preferred polymeric compound is an acrylic resin.

Again in this embodiment, as long as a dry solid coating without tackiness can be formed after evaporation of the organic solvent, the solvent-type solid coating composition may further contain one or more additional components, in addition to the polymeric compound, in order to reduce friction and avoid peeling of the coating when installing a protector.

An example of such additional components is a solid lubricating powder such as silica, calcium stearate, molybdenum disulfide, tungsten disulfide, graphite, polytetrafluoroethylene, and boron nitride, which can be present in the composition in an amount of at most 5 mass % based on the solids content of the composition. Preferably it is selected from silica, calcium stearate, calcium hydroxide, and calcium carbonate. More preferably it is silica or calcium stearate.

The organic solvent in which the polymeric compound is dissolved to form the solvent-type solid coating composition is preferably a volatile solvent. Thus, in contrast to a base oil in a lubricating oil, the solvent preferably evaporates during the film-forming process, and preferably substantially none remains in the lubricating coating.

There is no particular restriction on the type of solvent. Examples of volatile solvents which are suitable for use in the present invention are petroleum solvents such as cleaning solvent and mineral spirits, both specified as industrial gasoline by JIS K 2201, aromatic petroleum naphtha, xylene, Cellosolves, methyl ethyl ketone, toluene, and cyclohexanone. A mixture of two or more of these may be used. A solvent having a flash point of at least 30° C., an initial boiling point of at least 150° C., and a final boiling point of at most 210° C. is preferred from the standpoints that it is relatively easy to handle and evaporates rapidly so that the drying time can be short.

Whether the solid coating composition is an aqueous composition or a solvent-type composition in an organic solvent, in addition to the above-described components, the composition may contain one or more additives such as an antioxidant, a preservative, and a coloring agent.

For either type of solid coating composition, its viscosity (kinematic viscosity in cSt as measured with a Brookfield viscometer) can be suitably adjusted depending on the coating method by addition of the solvent or the like. A preferable viscosity is at most 4000 cSt at 40° C. in the case of spray coating or immersion and at most 1000 cSt at 60° C. in the case of brush coating.

In a third embodiment, the solid coating composition for forming the upper layer of a dry solid coating is a coating composition based on an ultraviolet curing resin. A known ultraviolet curing resin which comprises at least a monomer, an oligomer, and a photopolymerization initiator can be used. As long as it causes photopolymerization upon irradiation with ultraviolet rays to form a cured film, there is no particular restriction on the ultraviolet curing resin.

The monomer includes but is not limited to di- or higher esters of polyhydric alcohols with (meth)acrylic acid as well as various (meth)acrylate compounds, N-vinylpyrrolidone, N-vinylcaprolactam, and styrene. The oligomer includes but is not limited to epoxy (meth)acrylate, urethane (meth)acrylate, polyester (meth)acrylate, polyether (meth)acrylate, and silicone (meth)acrylate.

Useful photopolymerization initiators are compounds having absorption in the wavelength region of 260-450 nm, which include benzoin and its derivatives, benzophenone and its derivatives, acetophenone and its derivatives, Michler's ketone, benzil and its derivatives, tetralkylthiuram monosulfide, thioxanes, and the like. It is particularly preferred to use a thioxane.

In view of the strength and sliding properties of a coating, a solid dry coating formed from an ultraviolet curing resin preferably further comprises a solid substance selected from a lubricant and a fibrous filler. Examples of the lubricant are metal soaps such as calcium stearate and polytetrafluoroethylene (PTFE) resins, and an example of the fibrous filler is acicular calcium carbonate such as "whiscal" sold by Maruo Calcium, Japan. One or more of these solid substances may be added in an amount of 0.05-0.35 parts relative to one part of the ultraviolet curing resin on a mass basis. An amount of less than 0.35 parts may be insufficient to appreciably increase the coating strength. An amount of more than 0.35 parts may increase the viscosity of the coating composition to such an extent that the coatability is lowered or the coating strength becomes insufficient. Preferably, both the lubricant and the fibrous filler are added.

Irradiation with ultraviolet rays can be performed using a commercially available apparatus for ultraviolet-light irradiation having an output wavelength in the range of 200-450 nm. The ultraviolet light source may be, for example, a high-pressure mercury lamp, an ultrahigh-pressure mercury lamp, a xenon lamp, a carbon arc lamp, a metal halide lamp, or sunlight.

In any of the above-described embodiments, the thickness of the dry solid coating is preferably in the range of 5-50 μm and smaller than the thickness of the underlying lubricating coating.

The dry solid coating is formed in order to eliminate the tackiness of the viscous liquid or semisolid lubricating coating. As a result, when a steel pipe for OCTG is stood vertically to connect by a threaded joint and rust deposited on the inner surface of the pipe or blasting abrasive particles introduced to remove rust fall down inside the pipe, there is almost no possibility of the rust or particles adhering to or being embedded in the coated surface of the threaded joint. Even if there is slight adhesion of such foreign matter, it can be completely removed by blowing air. Consequently, the occurrence of galling due to adhered foreign matter is prevented, and the galling resistance of the threaded joint is markedly improved. In addition, the dry solid coating has the effect of protecting the underlying viscous liquid or semisolid lubricating coating, and the rust preventing effect of the lubricating coating can be achieved with certainty, so the rust resistance of the threaded joint is also improved.

If the thickness of the dry solid coating is too small, when a protective member such as a protector having high airtightness is installed on the end of a steel pipe for OCTG as shown in FIG. 1, there are cases in which the dry solid coating is damaged by the force applied in installing the protector. On the other hand, if the thickness of the dry solid coating is too large, it may become difficult for the lower lubricating coating to exhibit galling resistance.

The relationship (thickness of the viscous liquid or semisolid lubricating coating)>(thickness of the dry solid coating) is preferably satisfied in order to make it difficult for the dry solid coating to interfere with the effect of the lubricating coating of preventing galling.

[Preparatory Surface Treatment]

In a threaded joint for steel pipes according to the present invention which has a viscous liquid or semisolid lubricating coating formed on a contact surface of a pin and/or a box and a dry solid coating formed atop the lubricating coating, if the contact surface covered by these coatings has been subjected to preparatory surface treatment for roughening such that the surface roughness is larger than the surface roughness formed by machining, which is 3-5 μm, in many cases galling resistance is increased. Accordingly, prior to forming the first layer of the lubricating coating, preparatory surface treatment of the contact surface is preferably carried out to roughen the contact surface.

Examples of such preparatory surface treatment are blasting by projecting blasting material such as spherical shot or angular grit; pickling by immersion in a strongly acidic liquid such as sulfuric acid, hydrochloric acid, nitric acid, or hydrofluoric acid to roughen the skin; chemical conversion treatment such as phosphate treatment, oxalate treatment, or borate treatment (forming a crystalline coating with the surface roughness increasing as the crystals grow); and metal plating. Metal plating includes electroplating with copper, iron, or their alloys (projections are selectively plated, so the surface becomes slightly rougher); impact plating with zinc or a zinc alloy by allowing particles having an iron core covered with zinc or a zinc-iron alloy to impinge on a surface by the action of centrifugal force or air pressure to form a zinc or zinc-iron alloy coating; and compound metal plating to form a coating having minute solid particles dispersed in metal.

Whichever surface treatment method is used for the contact surface, it is preferably carried out such that the surface has a surface roughness Rmax in the range of 5-40 μm. If Rmax is less than 5 μm, adhesion and retention of the lubricating coating are not be sufficiently improved. On the other hand, if Rmax exceeds 40 μm, the friction of the surface significantly increases, and there are cases that the coating cannot withstand shearing forces and compressive forces when undergoing a high pressure so that it is easily destroyed or peels off. Two types of surface treatment for the purpose of surface roughening can be carried out.

From the standpoint of the adhesion of the lubricating coating, surface treatment which can form a porous coating is preferred. In particular, phosphate treatment (phosphating) using manganese phosphate, zinc phosphate, iron manganese phosphate, or zinc calcium phosphate or impact plating to form a zinc or zinc-iron alloy coating are preferred. From the standpoint of adhesion of a lubricating coating formed thereon, a manganese phosphate coating is preferred, and from the standpoint of corrosion prevention, a zinc or zinc-iron alloy coating which can be expected to provide a sacrificial corrosion effect due to zinc is preferred.

Either a coating formed by phosphating or a zinc or zinc-iron alloy coating formed by impact plating is a porous coating. If a lubricating coating is formed atop it, the adhesion of the lubricating coating is increased by the so-called "anchor effect" of a porous coating. As a result, it becomes difficult for peeling of the solid lubricating coating to take place even if tightening and loosening are repeated, contact between metals in the contact surface of the joint is effectively prevented, and galling resistance, air tightness, and corrosion resistance are further increased.

Phosphating can be carried out by immersion or spraying in a conventional manner. A common phosphating solution for use in treatment of zinc-plated steels which is an acidic solution of a phosphate can be used. For example, a typical zinc phosphating solution comprises 1-150 g/L of phosphate ions, 3-70 g/L of zinc ions, 1-100 g/L of nitrate ions, and 0-30 g/L of nickel ions. A manganese phosphating solution which is often used for surface treatment of threaded joints can also be used. The temperature of a phosphating solution which is used may be from room temperature to 100° C. and the duration of treatment may be up to 15 minutes depending on the desired coating thickness. In order to accelerate the formation of a phosphate coating, prior to phosphating, the surface to be treated can be supplied with an aqueous surface conditioning solution containing colloidal titanium. After treatment with a phosphating solution, the treated surface is preferably washed with cold or warm water prior to drying.

Impact plating can be carried out by mechanical plating in which particles are impacted with a material to be plated inside a rotating barrel, or by blast plating in which particles are impacted against a material to be plated using a blasting apparatus. In the present invention, it is sufficient to plate just the contact surface, so it is preferable to employ blast plating which can perform localized plating.

Blast plating can be performed using particles having an iron-based core coated with zinc or a zinc alloy, which are allowed to impinge against a contact surface to be coated. The particles preferably have a content of zinc or zinc alloy in the range of 20-60 mass % and a particle diameter in the range of 0.2-1.5 mm. When the particles impinge against the contact surface, only the zinc or zinc alloy covering layer of the particles adheres to the contact surface, so a porous coating of zinc or a zinc alloy is formed atop the contact surface. Blast plating can form a plated coating having good adhesion to a steel surface regardless of the composition of the steel.

From the standpoints of both corrosion resistance and adhesion, the thickness of the zinc or zinc alloy coating formed by impact plating is preferably 5-40 μm. If it is less than 5 μm, adequate corrosion resistance cannot be obtained in some cases. On the other hand, if it exceeds 40 μm, the adhesion to the lubricating coating may end up decreasing. Similarly, the thickness of a phosphate coating is preferably in the range of 5-40 μm.

Another surface treatment may be employed. For example, one or more plating layers with a metal or metal alloy are effective at improving galling resistance. Examples of such plating includes single-layer plating with Cu, Sn, or Ni metal, as well as single-layer plating with a Cu—Sn alloy, two-layer plating with Cu and Sn layers, and three-layer plating with Ni, Cu, and Sn layers as described in JP 2003-74763A. For a steel pipe made of a steel having a Cr content greater than 5%, Cu—Sn alloy plating, two-layer plating of Cu plating-Sn plating, and three-layer plating of Ni plating-Cu plating-Sn plating are preferred. More preferred are two-layer plating of Cu plating-Sn plating, and three-layer plating of Ni strike plating-Cu plating-Sn plating. Such metal or metal alloy plating can be carried out by a known method as described in JP 2003-74763A.

[Surface Treatment of the Other Member]

When a first layer of a viscous liquid or semisolid lubricating coating and a second layer of a dry solid coating atop the first layer according to the present invention are formed on the contact surface of just one of the pin and the box of a threaded joint, the contact surface of the other member which is not coated with these coatings may be left in an untreated state, but preferably, the above-described preparatory surface treatment is carried out to roughen the contact surface. As a result, when connection to the member which is coated with the lubricating coating and the dry solid coating according to the present invention is carried out, the contact surface of the other member not having the lubricating coating exhibits good holding ability of the lubricating coating due to the anchor effect produced by surface roughening, thereby increasing galling resistance.

In order to impart rust preventing properties, a dry solid coating can be formed atop this layer of surface treatment. By preventing the contact surface from exposing to air by means of this dry solid coating, even when the contact surface is brought into contact with condensed water during storage, the occurrence of rust on the contact surface is prevented. The material and thickness of the dry solid coating may be the same as described above. As described above, this dry solid coating is destroyed by the impact applied at the time of initial tightening so as to be incorporated into the lubricating coating on the mating member, so it does not interfere with the lubricating properties produced by the lubricating coating.

EXAMPLES

The effects of the present invention will be illustrated by the following examples and comparative examples. Below, the contact surface including the threaded portion and the unthreaded metal contact portion of a pin will be referred to as the "pin surface", and the contact surface including the threaded portion and the unthreaded metal contact portion of a box will be referred to as the "box surface". The surface roughness is expressed as Rmax.

The surface treatment shown in Table 2 was carried out on the pin surface and the box surface of a threaded joint (outer diameter=17.78 cm (7 inches), wall thickness=1.036 cm (0.408 inches)) made from the carbon steel A, the Cr—Mo steel B, the 13% Cr steel C, or the high alloy steel D shown in Table 1 (galling occurs increasingly easily from composition A to composition D). A viscous liquid or semisolid lubricating coating and a dry solid coating were both formed by air spray coating. The proportions of the components present in each coating compositions are indicated as mass ratios in the examples and the comparative examples unless otherwise specified.

In a tightening and loosening test for each of the examples and comparative examples, prior to initial tightening, the vicinity of the contact surfaces of the pin and box was maintained at approximately 50° C. for one hour by blowing hot air (except for Comparative Examples 1 and 2), and then iron powder was dispersed on the contact surfaces to simulate the state in which oxide scale powder on the inner surface of the steel pipe moves to and adheres to the coated portions when a steel pipe is stood vertically. Blowing with air was then carried out to remove the deposited iron powder.

Tightening was carried out at a tightening speed of 10 rpm with a tightening torque of 14 kN-m, and after loosening, the contact surfaces of the pin and the box were investigated for seizing. When scratches due to seizing which developed during tightening were slight and it was possible to perform retightening by carrying out repair, repair was performed and tightening and loosening were repeated ten times or until loosening became impossible due to the occurrence of galling (unrepairable severe seizing). The results of the tightening and loosening test are shown in Table 3.

TABLE 1

Chemical composition of threaded joint (mass %, remainder: Fe and impurities)

| | C | Si | Mn | P | S | Cu | Ni | Cr | Mo |
|---|---|---|---|---|---|---|---|---|---|
| A | 0.24 | 0.3 | 1.3 | 0.02 | 0.01 | 0.04 | 0.07 | 0.17 | 0.04 |
| B | 0.25 | 0.25 | 0.8 | 0.02 | 0.01 | 0.04 | 0.05 | 0.95 | 0.18 |
| C | 0.19 | 0.25 | 0.8 | 0.02 | 0.01 | 0.04 | 0.1 | 13 | 0.04 |
| D | 0.02 | 0.3 | 0.5 | 0.02 | 0.01 | 0.5 | 7 | 25 | 3.2 |

TABLE 2

| No. | Pin Peparatory surface treatment | Pin Lubricating coating | Pin Dry solid coating | Box Preparatory surface treatment | Box Lubricating coating | Box Dry solid coating | Steel |
|---|---|---|---|---|---|---|---|
| Ex. 1 | 1. grinding (R = 3) 2. Zn phosphate (R = 10) (t = 15) | none | none | 1. grinding (R = 3) 2. Mn phosphate (R = 10) (t = 15) | paraffin wax, Ca stearate (t = 20) | acrylic resin (t = 8) | A |
| Ex. 2 | 1. grinding (R = 3) 2. Zn phosphate (R = 10) (t = 15) | none | acrylic resin (t = 10) | 1. grinding (R = 3) 2. Mn phosphate (R = 10) (t = 15) | paraffin wax, Ca stearate, natural asphalt (t = 30) | acrylic resin (t = 15) | B |
| Ex. 3 | sand blasting (R = 10) | paraffin wax, Ca stearate, Ca sulfonate[1] (t = 25) | acrylic resin (t = 30) | 1. grinding (R = 3) 2. Zn blast plating (t = 7) (R = 5) | paraffin wax, Ca stearate, Ca sulfonate[1] (t = 25) | acrylic resin (t = 20) | D |
| Ex. 4 | sand blasting (R = 10) | none | acrylic resin, silica | 1. grinding (R = 3) | paraffin wax, Ca stearate, | acrylic resin, silica | C |

TABLE 2-continued

| | Pin | | | Box | | | |
|---|---|---|---|---|---|---|---|
| No. | Peparatory surface treatment | Lubricating coating | Dry solid coating | Preparatory surface treatment | Lubricating coating | Dry solid coating | Steel |
| | | | (t = 20) | 2. 3-layer plating (strike Ni—Cu—Sn) (t = 10) (R = 5) | Ca phenate[3] (t = 90) | (t = 30) | |
| Ex. 5 | sand blasting (R = 10) | none | polyethylene oxide (t = 20) | 1. grinding (R = 3) 2. Cu—Sn alloy plating (t = 12) (R = 5) | paraffin wax, Ca stearate, Ca salicylate[2] (t = 50) | polyethyl-ene oxide (t = 15) | C |
| Ex. 6 | 1. grinding (R = 3) 2. oxalate (R = 8) (t = 4) | none | acrylic resin (t = 10) | 1. grinding (R = 3) 2. oxalate (R = 7) (t = 3) | paraffin wax, Ca stearate, Ca salicylate[2] natural asphalt (t = 25) | acrylic resin (t = 10) | C |
| Ex. 7 | 1. grinding (R = 3) 2. Zn phosphate (R = 10) (t = 14) | none | UV curing resin, Ca stearate, acicular $CaCO_3$ (t = 15) | 1. grinding (R = 3) 2. Mn phosphate (R = 10) (t = 12) | paraffin wax, Ca stearate graphite (t = 20) | UV curing resin, Ca stearate, acicular $CaCO_3$ (t = 15) | A |
| Comp. Ex. 1 | grinding (R = 3) | compound grease (API Bulletin 5A2) | none | 1. grinding (R = 3) 2. Mn phosphate (R = 10) (t = 15) | compound grease (API Bulletin 5A2) | none | A |
| Comp. Ex. 2 | grinding (R = 3) | paraffin wax, Ca stearate, Ca salicylate[2] (t = 30) | none | 1. grinding (R = 3) 2. Mn phosphate (R = 10) (t = 15) | paraffin wax, Ca stearate, Ca salicylate[2] (t = 30) | none | B |
| Comp. Ex. 3 | grinding (R = 3) | none | none | 1. grinding (R = 3) 2. Mn phosphate (R = 10) (t = 15) | Ca sulfonate[1] (t = 11) | oxide wax[4] (t = 5) | A |

Notes:
R: surface roughness (μm);
t: coating thickness (μm)
[1] highly basic calcium sulfonate;
[2] highly basic calcium salicylate;
[3] highly basic calcium phenate;
[4] oxide wax with melting point of 65° C. (solid at 40° C.).

TABLE 3

| Example No. | Occurrence of galling[1] after tightening up to 10 cycles (figure: number of tightening cycles) | | | | | | | | | | Comments |
|---|---|---|---|---|---|---|---|---|---|---|---|
| | 1 | 2 | 3 | 4 | 5 | 6 | 7 | 8 | 9 | 10 | |
| Ex. 1 | ○ | ○ | ○ | ○ | ○ | ○ | ○ | ○ | ○ | ○ | |
| Ex. 2 | ○ | ○ | ○ | ○ | ○ | ○ | ○ | ○ | ○ | ○ | |
| Ex. 3 | ○ | ○ | ○ | ○ | ○ | ○ | ○ | Δ | Δ | Δ | |
| Ex. 4 | ○ | ○ | ○ | ○ | ○ | ○ | ○ | ○ | Δ | Δ | |
| Ex. 5 | ○ | ○ | ○ | ○ | ○ | ○ | Δ | Δ | Δ | Δ | |
| Ex. 6 | ○ | ○ | ○ | ○ | ○ | ○ | ○ | Δ | Δ | Δ | |
| Ex. 7 | ○ | ○ | ○ | ○ | ○ | ○ | ○ | ○ | ○ | ○ | |
| Comp. Ex. 1 | ○ | ○ | ○ | ○ | ○ | ○ | ○ | ○ | Δ | Δ | Contains harmful heavy metals such as Pb; very tacky |
| Comp. Ex. 2 | ○ | ○ | ○ | Δ | Δ | X | — | — | — | — | Very tacky, much adhesion of iron powder |
| Comp. Ex. 3 | ○ | X | — | — | — | — | — | — | — | — | Very tacky above 40° C., much adhesion of iron powder |

Notes:
[1] ○: No occurrence of seizing;
Δ: Light seizing occurred (retightening possible after repairing seizing scratches);
X: Galling (unrepairable severe seizing) occurred;
—: Test terminated

Example 1

The following surface treatment was performed on a threaded joint made of the carbon steel having composition A shown in Table 1.

The box surface was finished by machine grinding (surface roughness of 3 μm) and immersed for 10 minutes in a manganese phosphating solution at 80-95° C. to form a manganese phosphate coating with a thickness of 15 μm (surface roughness of 10 μm). A lubricating coating composition formed from one part of paraffin wax with a melting point of 65° C., two parts of calcium stearate, and two parts of an organic solvent (mineral spirits) was then applied to the box surface by spray coating, and after evaporation of the organic solvent, a semisolid lubricating coating with a thickness of 20 μm was formed. Atop this lubricating coating, a coating composition formed from one part of water and 0.43 parts of an acrylic resin was applied by spray coating, and after evaporation of the water, a dry solid coating with a thickness of 8 μm was formed.

The pin surface was finished by machine grinding (surface roughness of 3 μm) and then immersed for 10 minutes in a zinc phosphating solution at 75-85° C. to form a zinc phosphate coating with a thickness of 15 μm (surface roughness of 10 μm).

Even at approximately 50° C., there was no adhesion at all of iron powder to the dry solid coating of the box surface. In the tightening and loosening test, as shown in Table 3, there was no occurrence of seizing in 10 cycles of tightening and loosening, and the results were extremely good.

Example 2

The following surface treatment was carried out on a threaded joint made of the Cr—Mo steel having composition B shown in Table 1.

The box surface was finished by machine grinding (surface roughness of 3 μm) and then immersed for 10 minutes in a manganese phosphating solution at 80-95° C. to form a manganese phosphate coating with a thickness of 15 μm (surface roughness of 10 μm). The box surface was then coated with a lubricating coating composition formed from one part of paraffin wax with a melting point of 65° C., two parts of calcium stearate, 0.1 parts of natural asphalt powder (gilsonite), and two parts of an organic solvent (mineral spirits) by spray coating, and after evaporation of the organic solvent, a semisolid lubricating coating with a thickness of 30 μm was formed. Atop the lubricating coating, a coating composition formed from one part of water, 0.5 parts of an acrylic resin, and 0.05 parts of dipropylene glycol n-butyl ether was applied by spray coating, and after evaporation of water, a dry solid coating with a thickness of 15 μm was formed.

The pin surface was finished by machine grinding (surface roughness of 3 μm) and then immersed for 10 minutes in a zinc phosphating solution at 75-85° C. to form a zinc phosphate coating with a thickness of 15 μm (surface roughness of 10 μm). On the surface of the phosphate coating, a composition formed from one part of water and 0.5 parts of an acrylic resin was applied by spray coating, and after evaporation of the water, a dry solid coating with a thickness of 10 μm was formed.

Even at approximately 50° C., there was absolutely no adhesion of iron powder to the dry solid coating of the pin or box. In the tightening and loosening test, as shown in Table 3, there was no occurrence of seizing in 10 cycles of tightening and loosening, and the results were extremely good.

Example 3

A threaded joint made of the high alloy steel having composition D shown in Table 1 underwent the following surface treatment.

The box surface was finished by machine grinding (surface roughness of 3 μm), and then a coating of porous zinc plating with a thickness of 7 μm (surface roughness of 5 μm) was formed thereon by blast plating using particles having an iron core coated with zinc. The box surface was then coated with a lubricating coating composition formed from one part of paraffin wax with a melting point of 70° C., three parts of calcium stearate, one part of highly basic calcium sulfonate (basicity of 400 mg KOH/g), and two parts of an organic solvent (mineral spirits) by spray coating, and after evaporation of the organic solvent, a viscous liquid lubricating coating with a thickness of 25 μm was formed. In the preparation of the lubricating coating composition, the calcium stearate was initially dissolved in the paraffin wax heated to at least its melting temperature, and then the other components were mixed therein. Atop the lubricating coating, a composition formed from one part of water and one part of an acrylic resin was applied by spray coating, and after evaporation of the water, a dry solid coating with a thickness of 20 μm was formed.

After the pin surface was given a surface roughness of 10 μm by sand blasting with #80 sand, the same lubricating coating composition as applied to the box surface was applied to the pin surface by spray coating, and after evaporation of the organic solvent, a viscous liquid lubricating coating with a thickness of 25 μm was formed. Atop the lubricating coating, a composition formed from one part of water and one part of an acrylic resin was applied by spray coating, and after evaporation of the water, a dry solid coating with a thickness of 30 μm was formed.

Even at approximately 50° C., there was absolutely no adhesion of iron powder to the dry solid coating of the pin or the box. The steel was a high alloy steel which undergoes seizing extremely easily, so in the tightening and loosening test with 10 cycles of tightening and loosening, as shown in Table 3, slight seizing occurred at the end of the eighth cycle. However, it was possible to continue to use with repair. This result is of a level at which there are absolutely no problems with respect to galling resistance.

Example 4

The following surface treatment was carried out on a threaded joint made of the 13% Cr steel having composition C shown in Table 1.

After the box surface was finished by machine grinding (surface roughness of 3 μm), multiple-layer plating with an overall thickness of 10 μm (surface roughness of 5 μm) and consisting of Ni strike plating, Cu plating, and Sn plating in that order was formed by electroplating. On the surface which was treated in this manner, a lubricating coating composition formed from one part of paraffin wax with a melting point of 70° C., four parts of calcium stearate, three parts of highly basic calcium phenate (basicity of 400 mg KOH/g), and two parts of an organic solvent (mineral spirits) was applied by spray coating, and after evaporation of the organic solvent, a viscous liquid lubricating coating with a thickness of 90 μm was formed. The calcium stearate was first dissolved in the paraffin wax heated to at least its melting temperature, and then the other components were mixed therewith. Atop the lubricating coating, a coating composition formed from one part of water, four parts of an acrylic resin, and 0.05 parts of silica powder was applied by spray coating, and after evaporation of the water, a dry solid coating with a thickness of 30 μm was formed.

After the pin surface was given a surface roughness of 10 μm by sand blasting with #80 sand, a coating composition formed from one part of water, four parts of an acrylic resin, and 0.05 parts of silica powder was applied by spray coating, and after evaporation of water, a dry solid coating with a thickness of 20 μm was formed.

Even at approximately 50° C., there was absolutely no adhesion of iron powder to the dry solid coating of the pin or the box. In the tightening and loosening test with ten cycles, as shown in Table 3, slight seizing occurred at the end of the ninth cycle, but tightening and loosening could be continued by performing repair. This result is of a level at which there are absolutely no problems with respect to galling resistance.

Example 5

The following surface treatment was carried out on a threaded joint made of the 13% Cr steel having composition C shown in Table 1.

After the box surface was finished by machine grinding (surface roughness of 3 μm), a plated coating of a copper-tin alloy with a thickness of 12 μm (surface roughness of 5 μm) was formed by electroplating. On the box surface which was treated in this manner, a lubricating coating composition formed from one part of paraffin wax with a melting point of 65° C., two parts of calcium stearate, four parts of highly basic calcium salicylate (basicity of 300 mg KOH/g), and two parts of an organic solvent (mineral spirits) was applied by spray coating, and after evaporation of the organic solvent, a viscous liquid lubricating coating with a thickness of 50 μm was formed. The calcium stearate was first dissolved in the paraffin wax heated to at least its melting temperature, and then the other components were mixed therewith. Atop the lubricating coating, a coating composition formed from one part of water and 0.1 parts of polyethylene oxide was applied by spray coating, and a dry solid coating with a thickness of 15 μm was formed.

After the pin surface was given a surface roughness of 10 μm by sand blasting with #80 sand, a coating composition formed from one part of water and 0.1 parts of polyethylene oxide was applied to the surface by spray coating, and after evaporation of the water, a dry solid coating with a thickness of 20 μm was formed.

Even at approximately 50° C., there was absolutely no adhesion of iron powder to the dry solid coating of the pin or the box. In the tightening and loosening test with ten cycles, as shown in Table 3, slight seizing occurred from the seventh cycle, but by performing repair, tightening and loosening could be performed through the tenth cycle. This result is of a level having no problems with respect to galling resistance.

Example 6

The following surface treatment was carried out on a threaded joint made of the 13% Cr steel having composition C shown in Table 1.

The box surface was finished by machine grinding (surface roughness of 3 μm) and then immersed for 15 minutes in an oxalate solution for chemical conversion treatment at a temperature of 85-95° C. to form an oxalate coating with a thickness of 3 μm (surface roughness of 7 μm). On the surface which was treated in this manner, a lubricating coating composition formed from one part of paraffin wax with a melting point of 65° C., two parts of calcium stearate, four parts of highly basic calcium salicylate (basicity of 300 mg KOH/g), 0.05 parts of natural asphalt (gilsonite), and two parts of an organic solvent (mineral spirits) was applied by spray coating, and after evaporation of the organic solvent, a semisolid lubricating coating with a thickness of 25 μm was formed. Atop the lubricating coating, a coating composition formed from one part of an organic solvent (toluene:cyclohexanone:methyl ethyl ketone=1:2:4), 0.25 parts of an acrylic resin, and 0.02 parts of dipropylene glycol n-butyl ether was applied by spray coating, and after evaporation of the organic solvent, a dry solid coating with a thickness of 10 μm was formed.

The pin surface was finished by machine grinding (surface roughness of 3 μm) and then immersed for 15 minutes in an oxalate film-forming chemical conversion treatment solution at 85-95° C. to form an oxalate coating with a thickness of 4 μm (surface roughness of 8 μm). On this coating surface, a coating composition formed from one part of an organic solvent (toluene:cyclohexanone:methyl ethyl ketone=1:2:4), 0.25 parts of an acrylic resin, and 0.02 parts of dipropylene glycol n-butyl ether was applied by spray coating, and after evaporation of the organic solvent, a dry solid coating with a thickness of 10 μm was formed.

Even at approximately 50° C., there was absolutely no adhesion of iron powder to the dry solid coating of the pin or the box. In the tightening and loosening test with ten cycles, as shown in Table 3, slight seizing occurred from the eighth cycle, but tightening and loosening could be continued through ten cycles by performing repair. This result is of a level at which there are no problems with respect to galling resistance.

Example 7

The following surface treatment was carried out on a threaded joint made of the carbon steel having composition A shown in Table 1.

The box surface was finished by machine grinding (surface roughness of 3 μm) and then immersed for 10 minutes in a manganese phosphating solution at 80-95° C. to form a manganese phosphate coating with a thickness of 12 μm (surface roughness of 10 μm). On the surface which was treated in this manner, a lubricating coating composition formed from one part of paraffin wax with a melting point of 65° C., two parts of calcium stearate, two parts of an organic solvent (mineral spirits), and 0.04 parts of graphite powder was applied by spray coating, and after evaporation of the organic solvent, a semisolid lubricating coating with a thickness of 20 μm was formed. Atop the lubricating coating, a coating composition comprising an ultraviolet curing resin sold by Nippon Kayaku which included KAYARAD THE 330 (an acrylate ester of trimethylolpropane and ethylene oxide), KAYACURE DETX-S (2,4-diethylthioxanthone) and KAYACURE EPA (ethyl 4-dimethylaminobenzoate), a lubricant (Calcium Stearate GP sold be NOF Corporation), and a fibrous filler of acicular calcium carbonate ("Whiscal" sold by Maruo Calcium Co., Ltd.) was applied. The mass ratio of the ultraviolet curing resin:lubricant:fibrous filler was 15:3:2. The coating was cured by irradiation with ultraviolet radiation of 260 nm in wavelength from an air-cooled mercury lamp with an output of 4 kW to form a dry sold coating with a thickness of 15 μm.

The pin surface was finished by machine grinding (surface roughness of 3 μm) and then immersed for 10 minutes in a zinc phosphating solution at 75-85° C. to form a zinc phosphate coating with a thickness of 14 μm (surface roughness of 10 μm). On the surface of the phosphate coating, the same ultraviolet-cured dry solid coating as formed on the box surface was formed with a thickness of 15 μm.

Even at approximately 50° C., there was absolutely no adhesion of iron powder to the dry solid coating of the pin or box. In the tightening and loosening test, as shown in Table 3, there was no occurrence of seizing in 10 cycles of tightening and loosening, and the results were extremely good.

Comparative Example 1

The following surface treatment was performed on a threaded joint made of the carbon steel having composition A shown in Table 1.

The box surface was finished by machine grinding (surface roughness of 3 μm) and then immersed for 10 minutes in a manganese phosphating solution at 80-95° C. to form a manganese phosphate coating with a thickness of 15 μm (surface roughness of 10 μm). Atop the phosphate coating, as a lubricant, a viscous liquid compound grease meeting API standards was applied (the combined coating weight on the pin and the box was 50 grams).

The pin surface was finished by machine grinding (surface roughness of 3 μm), and without further surface treatment, the above-described compound grease was applied thereto.

In the tightening and loosening test with ten cycles, as shown in Table 3, there was no occurrence of seizing up to the eighth cycle. Slight seizing occurred on the ninth cycle, but repair could be performed so that tightening and loosening were performed through the tenth cycle. However, in this example, the compound grease contained harmful heavy metals such as lead, and it can be considered harmful to humans and the environment. In addition, the surface is tacky, and foreign matter such as scale and sand adheres to and gets incorporated into the compound grease, which causes the problem that there are large variations in galling resistance.

Comparative Example 2

The following surface treatment was carried out on a threaded joint made of the Cr—Mo steel having composition B shown in Table 1.

The box surface was finished by machine grinding (surface roughness of 3 μm) and then immersed for 10 minutes in a manganese phosphating solution at 80-95° C. to form a manganese phosphate coating with a thickness of 15 μm (surface roughness of 10 μm). On the surface which was treated in this manner, a lubricating coating composition formed from one part of paraffin wax with a melting point of 65° C., two parts of calcium stearate, four parts of highly basic calcium salicylate (basicity of 300 mg KOH/g), and two parts of an organic solvent (mineral spirits) was applied by spray coating, and after evaporation of the organic solvent, a viscous liquid lubricating coating with a thickness of 30 μm was formed.

After the pin surface was finished by machine grinding (surface roughness of 3 μm), a lubricating coating composition formed from one part of paraffin wax with a melting point of 65° C., two parts of calcium stearate, four parts of highly basic calcium salicylate (basicity of 300 mg KOH/g), and two parts of an organic solvent (mineral spirits) was applied by spray coating, and after evaporation of the organic solvent, a lubricating coating with a thickness of 30 μm was formed.

In the tightening and loosening test with ten cycles, as shown in Table 3, there was no occurrence of seizing through the third cycle. However, slight seizing occurred on the fourth cycle, and although tightening and loosening were continued through the fifth cycle by performing repair, unrepairable severe seizing (i.e., galling) occurred on the sixth cycle. It is believed that the galling resistance decreased due to the tacky surface of the lubricating coating, which caused iron powder to adhere to the lubricating coating, and only a small amount of the powder could be removed by blowing air. Thus, the iron powder which remained adhering to the surface after air blowing is considered to be responsible for the decreased galling resistance.

Comparative Example 3

The following surface treatment was carried out on a threaded joint made of the carbon steel having composition A shown in Table 1.

The box surface was finished by machine grinding (surface roughness of 3 μm) and then immersed for 10 minutes in a manganese phosphating solution at 80-95° C. to form a manganese phosphate coating with a thickness of 15 μm (surface roughness of 10 μm). On the surface which was treated in this manner, a lubricating coating composition formed from a highly basic calcium sulfonate (basicity of 400 mg KOH/g) was applied by brush coating to form a viscous liquid lubricating coating with a thickness of 12 μm. Atop the viscous liquid lubricating coating, an oxide wax with a melting point of 65° C. which was heated to melt was applied by brush coating to form a solid lubricating (wax) coating with a thickness of approximately 5 μm.

The pin surface was finished by machine grinding (surface roughness of 3 μm) and not further treated.

At 50° C., softening of the upper layer of solid lubricating (wax) coating already progressed, and a large amount of iron powder adhered thereto. It was observed that a portion of the iron powder sank into the coating. In addition, the softened wax coating was intermingled with the lower layer of viscous liquid lubricating coating, and the coatings partly fluidized so that even sagging (nonuniformity of the coating thickness) developed.

In the tightening and loosening test with ten cycles, as shown in Table 3, there was no occurrence of seizing on the first cycle. However, unrepairable severe seizing or galling occurred on the second cycle. It is thought that the galling resistance greatly decreased because the surface became tacky and the coating softened while the threaded joint was kept at a temperature exceeding 40° C. As a result, iron powder adhered to and incorporated into the coating. In addition, the coating thickness become nonuniform, which further worsened the galling resistance.

Rust preventing properties were evaluated by preparing a coupon-shaped test piece (70 mm×150 mm×2 mm thick) of the same steel which had been subjected to the same surface treatment (preparatory treatment, lower lubricating coating, and upper dry solid coating) as employed for the box in each example (shown in the box column of Table 2) and subjecting the test piece to a humidity test (200 hours at a temperature of 50° C. and a humidity of 98%). It was confirmed by this test that there was no occurrence of rust for any of Examples 1 to 7.

The present invention has been described above with respect to embodiments which are considered to be preferred at the present time, but the present invention is not limited to the embodiments disclosed above. It is possible to make changes to an extent which is not contrary to the technical concept of the invention as understood from the claims and the specification as a whole, and a threaded joint employing such variations should be understood as being encompassed by the technical scope of the present invention.

The invention claimed is:

1. A threaded joint for steel pipes comprising a pin and a box each having a contact surface including a threaded portion and an unthreaded metal contact portion, characterized in that the contact surface of at least one of the pin and the box has a viscous liquid or semisolid lubricating coating and a dry solid coating formed atop the lubricating coating, and the viscous liquid or semisolid lubricating coating comprises wax and a fatty acid alkaline earth metal salt, the dry solid coating is formed of a solidified material having a resistance to softening at 50 degrees C., the thickness of the viscous liquid or semisolid lubricating coating is 10-200 µm, the thickness of the dry solid coating is 5-50 µm, and the thickness of the lubricating coating is greater than the thickness of the dry solid coating, wherein the dry solid coating is made from an ultraviolet curing resin and the dry solid coating contains a lubricant.

2. A threaded joint for steel pipes as set forth in claim 1, wherein the contact surface of one of the pin and the box has the viscous liquid or semisolid lubricating coating and the dry solid coating formed atop the lubricating coating, and the contact surface of the other of the pin and the box has been subjected to preparatory surface treatment by a method selected from blasting, pickling, phosphate chemical conversion treatment, oxalate chemical conversion treatment, borate chemical conversion treatment, metal plating, and a combination of two or more of these treatments.

3. A threaded joint for steel pipes as set forth in claim 2 wherein the contact surface of the other member has a dry solid coating on the surface which has been subjected to the preparatory surface treatment.

4. A threaded joint for steel pipes as set forth in claim 1 wherein the viscous liquid or semisolid lubricating coating is substantially free from lead, chromium, cadmium, and mercury.

5. A threaded joint for steel pipes as set forth in claim 4 wherein the viscous liquid or semisolid lubricating coating further comprises a solid lubricating powder.

6. A threaded joint for steel pipes as set forth in claim 1 wherein the dry solid coating contains a fibrous filler.

7. A threaded joint for steel pipes as set forth in claim 6 wherein the lubricant is a metal soap and the fibrous filler is an acicular carbonate.

8. A threaded joint for steel pipes as set forth in claim 1 wherein the contact surface having the viscous liquid or semisolid lubricating coating is subjected to preparatory surface treatment by a method selected from blasting, pickling, phosphate chemical conversion treatment, oxalate chemical conversion treatment, borate chemical conversion treatment, and a combination of two or more of these prior to forming the lubricating coating.

9. A threaded joint for steel pipes as set forth in claim 1 wherein the contact surface having the viscous liquid or semisolid lubricating coating is subjected to preparatory surface treatment by metal plating, metal alloy plating, or multi-layer plating with a metal and/or metal alloy prior to forming the lubricating coating.

10. An oil well steel pipe having the threaded joint as set forth in claim 1.

11. A method of connecting a plurality of steel pipes for use in an oil well without application of a lubricating grease, characterized by using a threaded joint as set forth in claim 1.

* * * * *